(12) United States Patent
Armistead et al.

(10) Patent No.: US 10,035,679 B2
(45) Date of Patent: Jul. 31, 2018

(54) ELEVATOR CONTROL SYSTEM USING MEETING INFORMATION TO CONTROL CAR DESTINATIONS

(75) Inventors: Jason R. Armistead, Avon, CT (US); Theresa M. Christy, West Hartford, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 497 days.

(21) Appl. No.: 14/381,052

(22) PCT Filed: Feb. 27, 2012

(86) PCT No.: PCT/US2012/026701
§ 371 (c)(1),
(2), (4) Date: Aug. 26, 2014

(87) PCT Pub. No.: WO2013/130032
PCT Pub. Date: Sep. 6, 2013

(65) Prior Publication Data
US 2015/0075914 A1    Mar. 19, 2015

(51) Int. Cl.
| B66B 1/18 | (2006.01) |
| B66B 1/24 | (2006.01) |
| B66B 1/46 | (2006.01) |
| G06Q 10/10 | (2012.01) |

(52) U.S. Cl.
CPC .............. B66B 1/2408 (2013.01); B66B 1/46 (2013.01); G06Q 10/1093 (2013.01); B66B 2201/235 (2013.01); B66B 2201/402 (2013.01); B66B 2201/4661 (2013.01)

(58) Field of Classification Search
CPC . B66B 1/2408; B66B 1/46; B66B 2201/4661; B66B 2201/235; B66B 2201/402; G06Q 10/1093
USPC ................. 187/247, 380–388, 391, 392, 393
See application file for complete search history.

(56) References Cited

U.S. PATENT DOCUMENTS

| 4,760,896 A | * | 8/1988 | Yamaguchi | ........... B66B 1/2458 |
| | | | | 187/382 |
| 4,901,822 A | * | 2/1990 | Tsuji | ..................... B66B 1/2458 |
| | | | | 187/386 |
| 5,159,163 A | | 10/1992 | Bahjat et al. | |

(Continued)

FOREIGN PATENT DOCUMENTS

| EP | 2604562 A2 | 6/2013 |
| EP | 2695839 A1 | 2/2014 |

(Continued)

OTHER PUBLICATIONS

Internation Search Report for application PCT/US2012/026701, dated Feb. 25, 2013, 5 pages.

(Continued)

*Primary Examiner* — Anthony Salata
(74) *Attorney, Agent, or Firm* — Cantor Colburn LLP

(57) ABSTRACT

An elevator control system including an elevator management system obtaining meeting information from at least one of a calendar system and a user interface; the elevator management system generating a control command in response to the meeting information; and an elevator controller controlling destinations of one or more elevator cars in response to the control command.

19 Claims, 2 Drawing Sheets

(56) References Cited

U.S. PATENT DOCUMENTS

| | | | | |
|---|---|---|---|---|
| 5,272,288 | A * | 12/1993 | Kameli | B66B 1/2408 187/387 |
| 5,554,832 | A * | 9/1996 | Lumme | B66B 1/468 187/380 |
| 5,616,896 | A * | 4/1997 | Kontturi | B66B 1/2458 187/382 |
| 6,202,799 | B1 * | 3/2001 | Drop | B66B 1/468 187/384 |
| 6,209,685 | B1 * | 4/2001 | Zaharia | B66B 1/468 187/381 |
| 6,341,668 | B1 * | 1/2002 | Fayette | B66B 3/008 187/247 |
| 6,471,013 | B2 | 10/2002 | Banno et al. | |
| 7,823,700 | B2 * | 11/2010 | Boss | B66B 1/468 187/247 |
| 8,172,042 | B2 | 5/2012 | Wesson et al. | |
| 8,172,044 | B2 * | 5/2012 | Tokura | B66B 1/2458 187/387 |
| 8,220,591 | B2 * | 7/2012 | Atalla | B66B 1/20 187/383 |
| 8,499,895 | B2 * | 8/2013 | Zweig | B66B 1/468 187/247 |
| 8,880,200 | B2 * | 11/2014 | Nowel | B66B 1/468 187/247 |
| 2010/0332648 | A1 | 12/2010 | Bohus et al. | |
| 2011/0100758 | A1 | 5/2011 | Zeweig | |
| 2017/0088397 | A1 * | 3/2017 | Buckman | H04W 4/80 |
| 2017/0137255 | A1 * | 5/2017 | Simcik | B66B 1/468 |

FOREIGN PATENT DOCUMENTS

| | | |
|---|---|---|
| JP | H07080641 B2 | 8/1995 |
| JP | 10139293 A | 5/1998 |
| JP | 2005015067 A | 1/2005 |
| JP | 3638881 B2 | 4/2005 |
| JP | 2005231781 A | 9/2005 |
| JP | 2009062151 A | 3/2009 |

OTHER PUBLICATIONS

Written Opinion for application PCT/US2012/026701, dated Feb. 21, 2013, 4 pages.

GB Office Action for application GB 1416887.6, dated Jan. 10, 2017, 4 pgs.

* cited by examiner

ELEVATOR CONTROL SYSTEM USING MEETING INFORMATION TO CONTROL CAR DESTINATIONS

BACKGROUND

The subject matter disclosed herein relates to elevator systems. More specifically, the subject matter disclosed herein relates to an elevator control system.

Elevator control systems typically cannot detect the presence of arriving passengers until they press a hall call button, enter a destination via a keypad/touchscreen or use their security credential at a turnstile or reader. In the case of up peak and down peak traffic, there is a steady increase in passenger arrival rates, and these peaks typically occur during the same periods of time each day and normally involve the lobby floor(s). The elevator control system can thus be programmed and configured in advance to handle these peak traffic periods, e.g., by parking more than one car at the lobby and dragging cars back to the lobby after they finish servicing passenger demand. Because these peak periods occur at regular times each day, a system capable of learning by analysing historical traffic patterns could deduce when and where these peak periods occur.

The random arrival or departure of large groups of passengers from one or more non-lobby floors in a building, such as those used for meeting rooms, can provide challenges for an elevator control system. The passengers arrive at or depart from these floors in a relatively short space of time, which provides a short duration peak in activity that could potentially cause long waiting times for passengers as the elevator system attempts to provide sufficient carrying capacity to service this unexpected demand. The system has no way of knowing when these bursts will occur, and so it cannot be pre-programmed to anticipate them. A learning system might be able to deduce which floors these peaks occur at, but since most meetings generally do not happen at consistent times, there would be a tendency to over-compensate and either assign too many or too few cars to service these floors.

SUMMARY

An embodiment is an elevator control system including an elevator management system obtaining meeting information from at least one of a calendar system and a user interface; the elevator management system generating a control command in response to the meeting information; and an elevator controller controlling destinations of one or more elevator cars in response to the control command.

Another embodiment is a method for controlling elevator cars, the method including obtaining meeting information from at least one of a calendar system and a user interface; generating a control command in response to the meeting information; and controlling destinations of one or more elevator cars in response to the control command.

These and other advantages and features will become more apparent from the following description taken in conjunction with the drawings.

The detailed description explains embodiments of the invention, together with advantages and features, by way of example with reference to the drawings.

DETAILED DESCRIPTION

Figure 1:
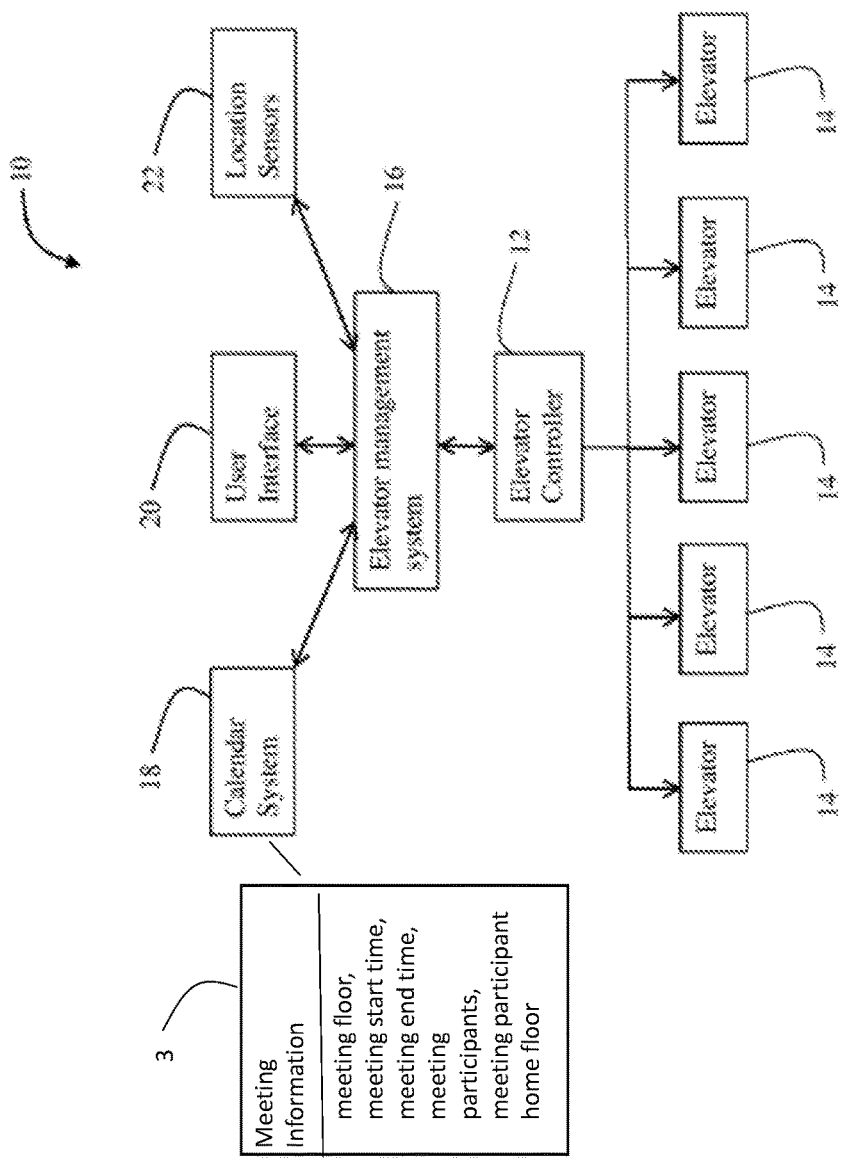
FIG. 1 is a schematic view of an elevator control system in an exemplary embodiment.

Shown in FIG. 1 is an embodiment of an elevator control system 10. An elevator controller 12 directs elevator cars 14 to floors based on control commands from an elevator management system 16. The elevator controller 12 may be a standard elevator controller used with existing elevator systems. This allows the elevator control system 10 to be incorporated into existing elevator systems without modification to the elevator controller 12. As such, elevator controller 12 responds to traditional up/down hall calls as known in the art, in addition to the providing the features described herein. Elevator controller 12 may also respond to priority or VIP calls as known in the art. Elevator management system 16 and elevator controller 12 may communicate over a medium, such as a local area network (LAN), a wireless network, point-to-point serial communications (e.g., RS-422), busses (e.g., CANbus), etc.

The elevator management system 16 may be implemented using a microprocessor based device (e.g., computer, server) executing a computer program stored in a memory to perform the functions described herein. Alternatively, the elevator management system 16 may be implemented in hardware (e.g., ASIC) or in a combination of hardware and software. As described herein, the elevator management system 16 performs functions to produce control commands. The elevator management system 16 may be implemented using an existing elevator management system in an elevator system. Alternatively, the elevator management system 16 may be implemented as add-on hardware/software to an existing elevator management system. Further, the elevator management system 16 logic that is used for the gathering and processing of calendar/user interface information could be embedded within the elevator controller 12. Accordingly, embodiments of the elevator management system 16 are not limited to those shown in FIG. 1.

The elevator management system 16 interfaces with a calendar system 18, a user interface 20 and location sensors 22 in order to generate control commands for elevator controller 12. Elevator management system 16 communicates with the calendar system 18, user interface 20 and location sensors 22 over a medium, such as a local area network (LAN) or a wireless network. The control commands, described in further detail herein, indicate where and when elevator cars 14 are to be positioned by elevator controller 12.

The calendar system 18 may be implemented using an existing client program providing calendaring functions (e.g., Microsoft OUTLOOK™) in conjunction with a server component (e.g., Microsoft EXCHANGE™). As described in further detail herein, when a meeting is scheduled in the calendar system 18, meeting information 3 is provided to the elevator management system 16. The elevator management system 16 uses the meeting information to generate control commands for the elevator controller 12. The calendar system 18 may be a personal calendar for an individual in the building, or may be a group calendar system used, for example, by a corporation to schedule corporate events. In a large, multi-tenanted building, it is possible that the elevator management system 16 would be integrated with more than one calendaring system 18 to obtain aggregate data for all tenants. In a building such as a hotel, where the passengers are generally short term guests, the hotel's event management personnel would enter meeting information in the calendar system 18 for each meeting, taking into account the event starting time, floor(s) reserved for guests, schedules, etc.

When a meeting room is booked through calendar system 18, meeting information may be provided to the elevator management system 16. The meeting information may include the floor on which the meeting is located, the starting and ending time of the meeting, the number of participants involved in the meeting, identity of participants (e.g., employee badge number), attributes associated with each participant, such as their home floor and office location, whether they are onsite (included) or offsite (excluded, anticipated to be a remote participant), etc. The participant attributes may be obtained from contact information stored in the calendar system 18, or another database (e.g., human resource records).

Various techniques may be used to provide the meeting information from the calendar system 18 to the elevator management system 16. In a first embodiment, the meeting information is pushed from the calendar system 18 to the elevator management system 16. When a meeting is scheduled in the calendar system 18, the meeting information is also conveyed by the calendar system 18 to the elevator management system 16. Users of the calendar system 18 may enable or disable sending meeting information 21 to the elevator management system 16 through user options 19. For example, an individual may not want personal meeting information (e.g., a doctor's appointment) sent to the elevator management system 16 and can block such transmission if desired.

In a second embodiment, the meeting information is pulled from the calendar system 18 by the elevator management system 16. The elevator management system periodically polls the calendar system 18 to retrieve new meeting information. Users of the calendar system 18 may enable or disable the ability of the elevator management system 16 to pull meeting information from the calendar system 18, either on a meeting-by-meeting basis, or globally. For example, an individual may not want personal meeting information (e.g., a doctor's appointment) pulled by the elevator management system 16 and can block such access if desired.

Elevator management system 16 also communicates with a user interface 20, through which users can notify the elevator management system 16 of their intended travel to and/or from the specific floor where the meeting occurs. User interface 20 may be implemented using a dedicated hardware interface to the elevator management system 16, or to the elevator controller 12. Alternatively, the user interface 20 may be a general-purpose computer executing a web browser that interfaces with the elevator management system 16. The user interface may also be implemented on mobile devices such as smart phones or tablets, executing a web browser or app. It is understood that multiple user interfaces 20 may be dispersed throughout a building. The user interface 20 allows a user to enter meeting information such as participants, source floor (e.g., the user's home floor), destination floor, meeting start time and meeting end time.

In alternate embodiments, meeting information may be directly input to the elevator management system 16. A calendar system and/or user interface may be directly implemented by the elevator management system 16, rather than being separate elements as shown in FIG. 1.

Location sensors 22 may communicate with the elevator management system 16 over a network such as a local area network (LAN) or a wireless network. Location sensors 22 may be placed in a number of locations such as parking garages, security checkpoints, turnstiles, doorways, hallways, etc. In exemplary embodiments, the location sensors are RFID readers that interrogate RFID cards carried by users to identify an individual user and their location.

Location sensors 22 may be used to track individuals to augment control commands. For example, through the calendar system 18 or user interface 20, the elevator management system 16 is notified that user A on the $20^{th}$ floor has a meeting on the $8^{th}$ floor that runs from 1 pm-2 pm. Based on this meeting information, the elevator management system 16 generates control commands for the elevator controller 12 to send an elevator car to the $20^{th}$ floor at 12:55 pm. At 12:50 pm, one of location sensors 22 indicates that user A has left their office. This prompts the elevator management system 16 to send an augmented control command to elevator controller 12 to send an elevator car to the $20^{th}$ floor now, as opposed to 12:55 pm, as the user is presumably heading to the elevator area of the $20^{th}$ floor. The user can then press the call button in the elevator landing and operate the elevator in normal fashion. Alternatively, the user can enter a destination call through a destination entry device. Alternatively, a destination call may be automatically entered upon detecting the user in the vicinity of the elevator.

Figure 2:
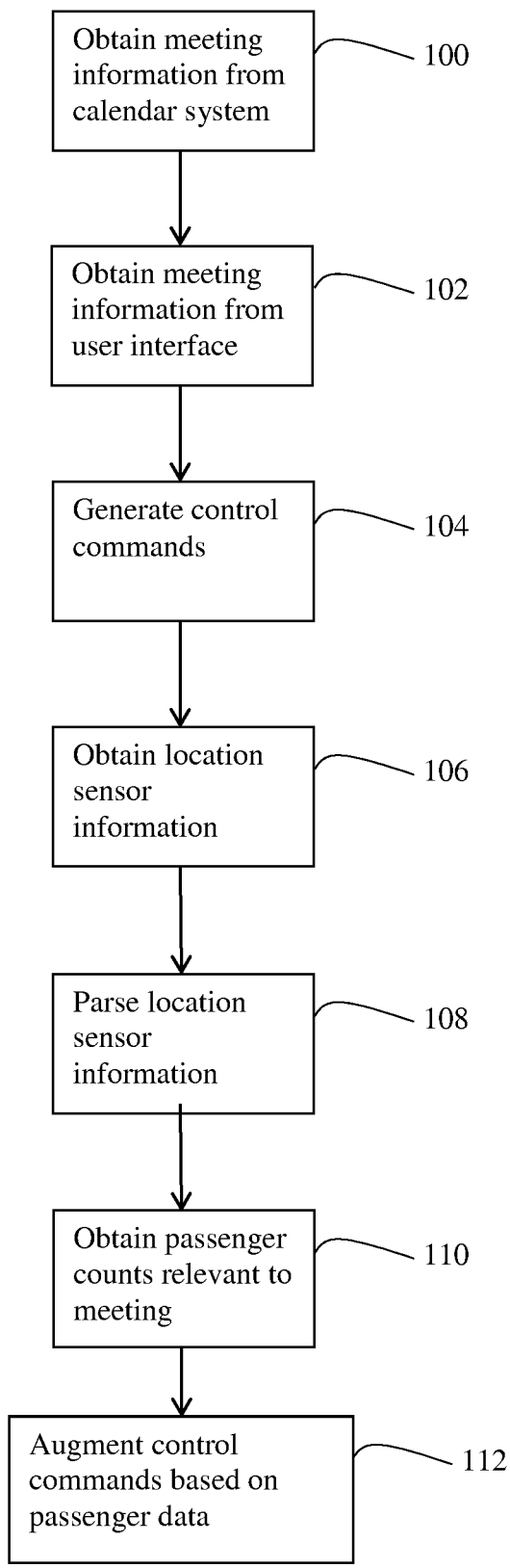
FIG. 2 is a flowchart of a process for generating control commands in an exemplary embodiment.

FIG. 2 is a flowchart of a process performed by the elevator management system 16 for generating control commands for the elevator controller 12. The process begins at 100 where the elevator management system 16 obtains meeting information from the calendar system 18. As noted previously, the meeting information may be pushed from the calendar system 18 to the elevator management system 16, or pulled from the calendar system 18 by the elevator management system 16. If the calendar system 18 is implemented as a component of the elevator management system 16, then no push or pull is needed.

At 102, elevator management system 16 obtains meeting information from the user interface 20. It is understood that steps 100 and 102 may occur simultaneously, or in opposite order. Also, obtaining meeting information from the calendar system 18 and the user interface 20 may occur periodically throughout the day.

At 104 the elevator management system 16 generates control commands based on the meeting information from one or both of the calendar system 18 and the user interface 20. The meeting information is analysed to detect times (meeting start and end times) when groups of people will be requiring elevator access, and the relevant home floors for the meeting participants and the meeting location floor. The elevator management system 16 then generates the control commands for the elevator controller 12 to handle traffic to and from the meeting based on the meeting information. The control commands may then be provided to the elevator controller 12 for storage and ultimate execution proximate to the meeting start time and meeting end time.

At 106, location sensor information is provided to the elevator management system 16 identifying locations of individuals. Location sensor information may be retrieved constantly during the day. Location sensor information is one form of passenger data that may be used to augment control commands as described herein. At 108, the location sensor information is parsed to detect location sensor information relevant to an upcoming meeting corresponding to the obtained meeting information. One exemplary form of parsing includes determining a user identity from the location sensor information (e.g., employee badge number) and determining if that user is a participant in a meeting within a predetermined time frame (e.g., 15 minutes). If the location sensor information identifies a meeting participant has left their office and is a participant in a meeting scheduled in the next 15 minutes, then this is considered relevant location sensor information. If a meeting participant has left their office, but has a meeting scheduled in 2 hours, then this location sensor information is not deemed relevant. Parsing the location sensor information prevents unrelated user activity from affecting the control commands to the elevator controller 12.

At 110, additional passenger data in the form of passenger counts relevant to the meeting are obtained by controller 12. Passenger counts 110 are also used to augment control commands in controller 12. A number of techniques may be used to generate passenger counts relevant to the meeting. Controller 12 can detect the weight of an elevator going to a meeting floor as an indication of a count of passengers attending the meeting. Also, the number of hall calls and destination calls to the meeting floor may also be used to derive a passenger count. The passenger count may be kept by controller 12 as a running total. The passenger count may be used to determine or forecast when the need for additional elevators will end, or reduce the number of elevators allocated for the meeting as the passenger count approaches the total meeting attendance.

At 112, the elevator management system 16 analyses the passenger data (e.g., relevant location sensor information and passenger counts) and augments one or more control commands, if necessary. In the above example, if location sensor data indicates a meeting participant has left their office and a meeting is scheduled in the next 15 minutes, this may indicate that meeting participants from that floor are starting to exit for the meeting and that one or more elevator cars should be sent to the home floor now, as opposed to a predetermined time. Similar adjustments may be made based on users arriving at parking facilities, turnstiles, security checkpoints, etc. With respect to passenger counts, controller 12 may detect that a majority of the meeting participants have been delivered to the meeting floor and then reduce the number of elevator cars allocated for the meeting participants.

The above described control commands relate primarily to sending cars to floors at certain times. The control commands may also involve other operational characteristics of the elevator cars. For example, if it is known that a meeting is letting out at 1 PM, then from 12:55 (or upon sensing a lot of people heading to the meeting floor) until 1:15 (or until a sensing few passengers) the elevators will use longer door dwell times (to allow more people to board without attempting to close) or shorter dwell times (no need to wait a reasonable time for people to arrive in hallway as passengers are already present and will fill car quickly). Additionally, the control commands may affect loading parameters such as number of people per car, how many unique destinations are assigned to any one car during this time period, etc. Thus, it is understood that the control commands go beyond routing elevator cars to floors at certain times and include other operational characteristics of the elevator cars.

The location sensors 22 may work directly with the elevator controller 12. In this embodiment, the elevator controller 12 obtains the location sensor information, parses the location sensor information, and augments the control commands based on the parsed location sensor information. The location sensor information would be fed directly to the elevator controller 12 which may then, optionally, provide feedback to the elevator management system 16. The need for additional elevators could end based on the meeting end time without the use of any feedback. Alternatively, the end time for providing elevators for the meeting may be determined by counting passengers going to the meeting floor by controller 12.

Embodiments enhance the ability of the elevator controller 12 to deal with bursts in traffic, by using the knowledge it can glean from the calendaring system and the user interface. Advance knowledge allows the dispatching algorithms to prepare by sending additional cars to the floors, reserving spare capacity in cars that might normally be close to full when they arrive, etc.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An elevator control system comprising:
an elevator management system obtaining meeting information from at least one of a calendar system and a user interface, the meeting information identifying at least two meeting participants;
the elevator management system generating a control command in response to the meeting information; and
an elevator controller controlling destinations of one or more elevator cars in response to the control command;
wherein the meeting information includes a meeting floor, meeting start time, meeting end time or meeting participant information.

2. The elevator control system of claim 1 wherein: the meeting information includes meeting participant home floor.

3. The elevator control system of claim 1 wherein: the meeting information is pushed from the calendar system to the elevator management system.

4. The elevator control system of claim 3 wherein: the calendar system includes an option to disable pushing meeting information to the elevator management system.

5. The elevator control system of claim 1 wherein: the meeting information is pulled from the calendar system by the elevator management system.

6. The elevator control system of claim 5 wherein: the calendar system includes an option to disable pulling meeting information by the elevator management system.

7. The elevator control system of claim 1 further comprising:
location sensors for sensing a location of a user, the location sensors providing location sensor information;
wherein one of the elevator management system and the elevator controller augments the control command in response to the location sensor information.

8. The elevator control system of claim 7 wherein: one of the elevator management system and the elevator controller parses the location sensor information to derive location sensor information relevant to a meeting in the meeting information.

9. The elevator control system of claim 8 wherein: parsing the location sensor information includes determining an identity of a user from the location sensor information; the identity of the user used to determine if the user is a participant in a meeting scheduled to begin within a predetermined time frame.

10. The elevator control system of claim 9 wherein: one of the elevator management system and the elevator controller augments the control command in response to the parsed location sensor information.

11. The elevator control system of claim 7 wherein: the elevator controller obtains passenger counts, the elevator controller augments the control command in response to the passenger counts.

12. A method for controlling elevator cars, the method comprising:
obtaining meeting information from at least one of a calendar system and a user interface, the meeting information identifying at least two meeting participants;
generating a control command in response to the meeting information; and
controlling destinations of one or more elevator cars in response to the control command;
wherein the meeting information includes a meeting floor, meeting start time, meeting end time or meeting participant information.

13. The method of claim 12 wherein: the meeting information includes meeting participant home floor.

14. The method of claim 12 further comprising: obtaining location sensor information and augmenting the control command in response to the location sensor information.

15. The method of claim 14 further comprising: parsing location sensor information to derive location sensor information relevant to a meeting in the meeting information.

16. The method of claim 15 wherein: parsing the location sensor information includes determining an identity of a user from the location sensor information the identity of the user used to determine if the user is a participant in a meeting scheduled to begin within a predetermined time frame.

17. The method of claim 16 further comprising: augmenting the control command in response to the parsed location sensor information.

18. The method of claim 12 wherein: the control command controls operational characteristics of the one or more elevator cars in addition to controlling destinations of one or more elevator cars.

19. An elevator control system comprising:
an elevator management system obtaining meeting information from at least one of a calendar system and a user interface, the meeting information identifying at least two meeting participants;
the elevator management system generating a control command in response to the meeting information; and
an elevator controller controlling destinations of one or more elevator cars in response to the control command;
wherein the meeting information includes a meeting floor, meeting start time, meeting end time, meeting participant information;
wherein the meeting information is transferred from the calendar system to the elevator management system, the calendar system includes an option to disable transferring meeting information to the elevator management system;
location sensors for sensing a location of a user, the location sensors providing location sensor information;
wherein one of the elevator management system and the elevator controller parses the location sensor information to derive location sensor information relevant to a meeting in the meeting information;
wherein one of the elevator management system and the elevator controller augments the control command in response to the parsed location sensor information;
wherein parsing the location sensor information includes determining an identity of a user from the location sensor information; the identity of the user used to determine if the user is a participant in a meeting scheduled to begin within a predetermined time frame.

* * * * *